Figure 1:
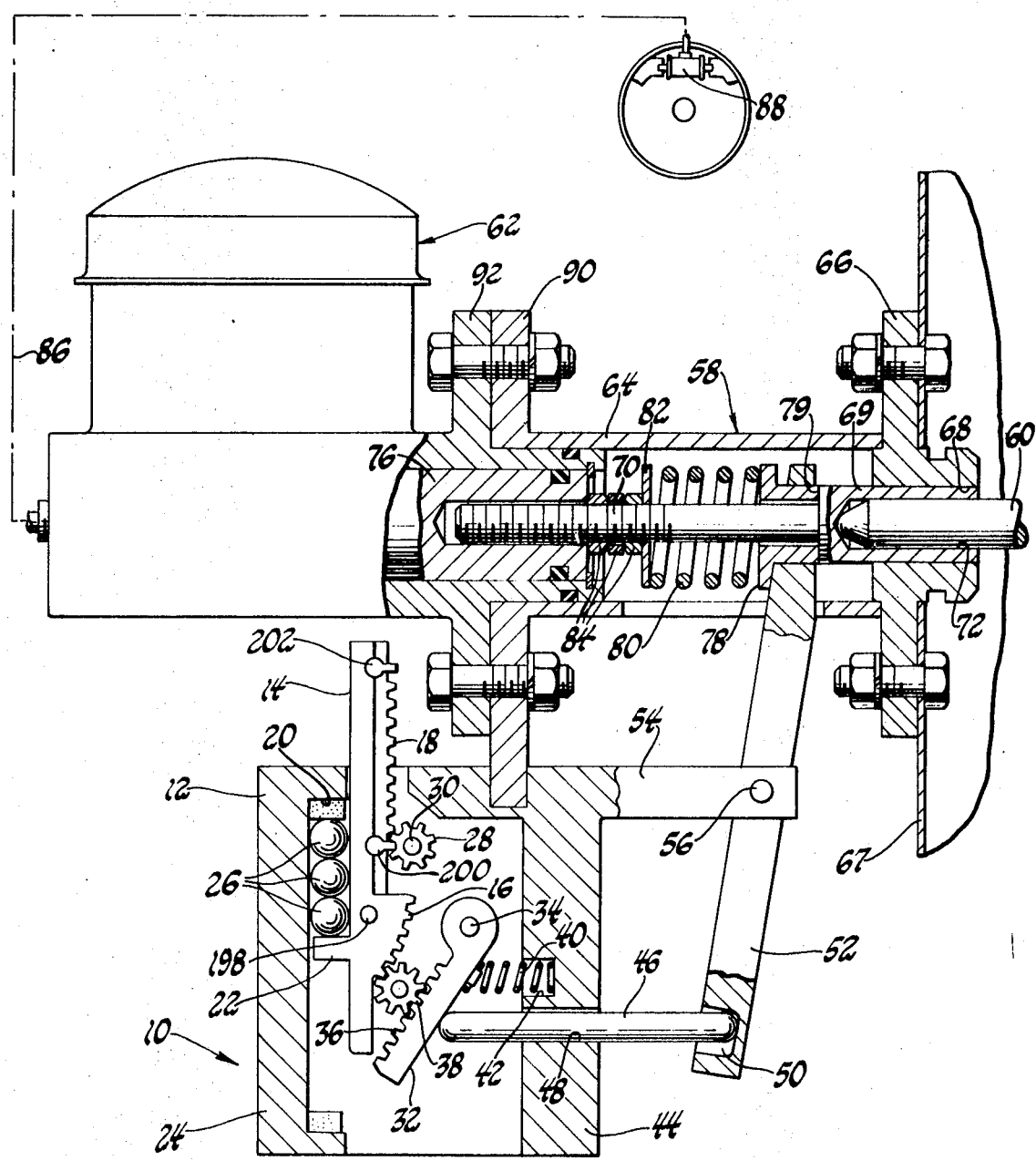

United States Patent

[11] 3,612,619

| [72] | Inventor | Henry L. Hayes |
| | | 496 E. Baker, Clawson, Mich. 48017 |
| [21] | Appl. No. | 31,113 |
| [22] | Filed | Apr. 23, 1970 |
| [45] | Patented | Oct. 12, 1971 |
| | | Continuation-in-part of application Ser. No. 801,618, Feb. 24, 1969, now Patent No. 3,549,207. |

[54] SAFETY BRAKE APPARATUS
12 Claims, 2 Drawing Figs.

[52] U.S. Cl. .................................................. 303/18,
74/110, 180/111, 188/106 P, 303/6.1, 303/13
[51] Int. Cl. ...................................................... B60t 7/12
[50] Field of Search .......................................... 180/111,
112–113, 82; 303/6.1, 13, 18; 188/106 P; 74/46,
89.16, 89.17, 89.18, 89.19, 89, 110

[56] References Cited
UNITED STATES PATENTS

| 1,816,677 | 7/1931 | Hanna | 74/110 |
| 1,855,043 | 4/1932 | Bowen | 303/6.1 |
| 2,734,590 | 2/1956 | Hays | 180/111 |
| 2,866,511 | 12/1958 | Niederoest | 180/111 |
| 3,365,965 | 1/1968 | French | 74/110 |
| 3,549,207 | 12/1970 | Hayes | 303/6.1 |

Primary Examiner—Milton Buchler
Assistant Examiner—John J. McLaughlin
Attorney—Barnard, McGlynn & Reising ABSTRACT: Apparatus for applying the hydraulic brakes of a vehicle upon opening a door and releasing the brakes when the vehicle is conditioned for normal driving. In the illustrated embodiment the opening of a door actuates a reversible electric motor which drives a cam member through a housing, thus, rotating a pinion which meshes with a pivotally mounted rack arm. The rack arm operates through a lever to depress an output plunger which is mechanically connected between a brake actuator rod and the piston of a master cylinder. Thus, vehicle brakes may be applied either through the automatic door opening responsive system or through the normal brake pedal.

PATENTED OCT 12 1971

3,612,619

SHEET 1 OF 2

INVENTOR.
Henry L. Hayes
BY
Barnard, McGlynn & Reising
ATTORNEYS

SAFETY BRAKE APPARATUS

This application is a continuation-in-part of copending U.S. Ser. No. 801,618 entitled Safety Brake Apparatus and filed on Feb. 24, 1969 in the name of Henry L. Hayes, now U.S. Pat. No. 3,549,207 and disclosed subject matter divided out of U.S. Ser. No. 801,618 by direction of the Patent Office.

This invention relates to vehicle hydraulic brake systems and more particularly to a system and components of a system for automatically applying the vehicle brakes when a door of the vehicle is opened either for operator exit or otherwise.

The copending application for Letters Patent, U.S. Ser. No. 801,618, discloses an apparatus which is responsive to the opening of a vehicle door to apply the brakes of that vehicle through an hydraulic system. In that patent application the mechanical actuator system includes a housing having a displaceable cam member mounted therein, a pivotally mounted rack arm, and a pinion which is disposed between and in meshing relationship with the cam member and the rack arm to pivot the rack arm in one direction to apply the brakes and in another direction to release the brakes in response to the opening and closing of a vehicle door respectively. The rack arm is operative through a plunger to control the state of an hydraulic brake system. The hydraulic brake system includes means for disabling the normal manually operated brake fluid circuit and auxiliarily pressurizing a portion of the brake fluid circuit between the hydraulic system and a wheel cylinder.

The present invention is adapted to employ substantially the same mechanical actuator arrangement as that disclosed in the above-identified, copending patent application but is adapted to operate directly through the master cylinder of an hydraulic brake system, thus, to eliminate the hydraulic actuator apparatus described above and to facilitate installation and servicing of the automatic brake application device. In general, the subject invention employs a mechanical actuator arrangement of the type described above and having an output means which is adapted for direct mechanical engagement with the input portions or piston of a conventional hydraulic master cylinder. In addition the input means is adapted for direct mechanical engagement with the normal brake actuator rod which, in the absence of the present invention, is directly connected to the master cylinder. Accordingly, the subject device may be mechanically interposed between the normal brake actuator rod and the master cylinder in such a fashion as to be capable of operating the brakes in an automatic condition-responsive fashion as well as operating the brakes in response to the normal pedal actuation produced by the driver in everyday driving.

Figure 2:
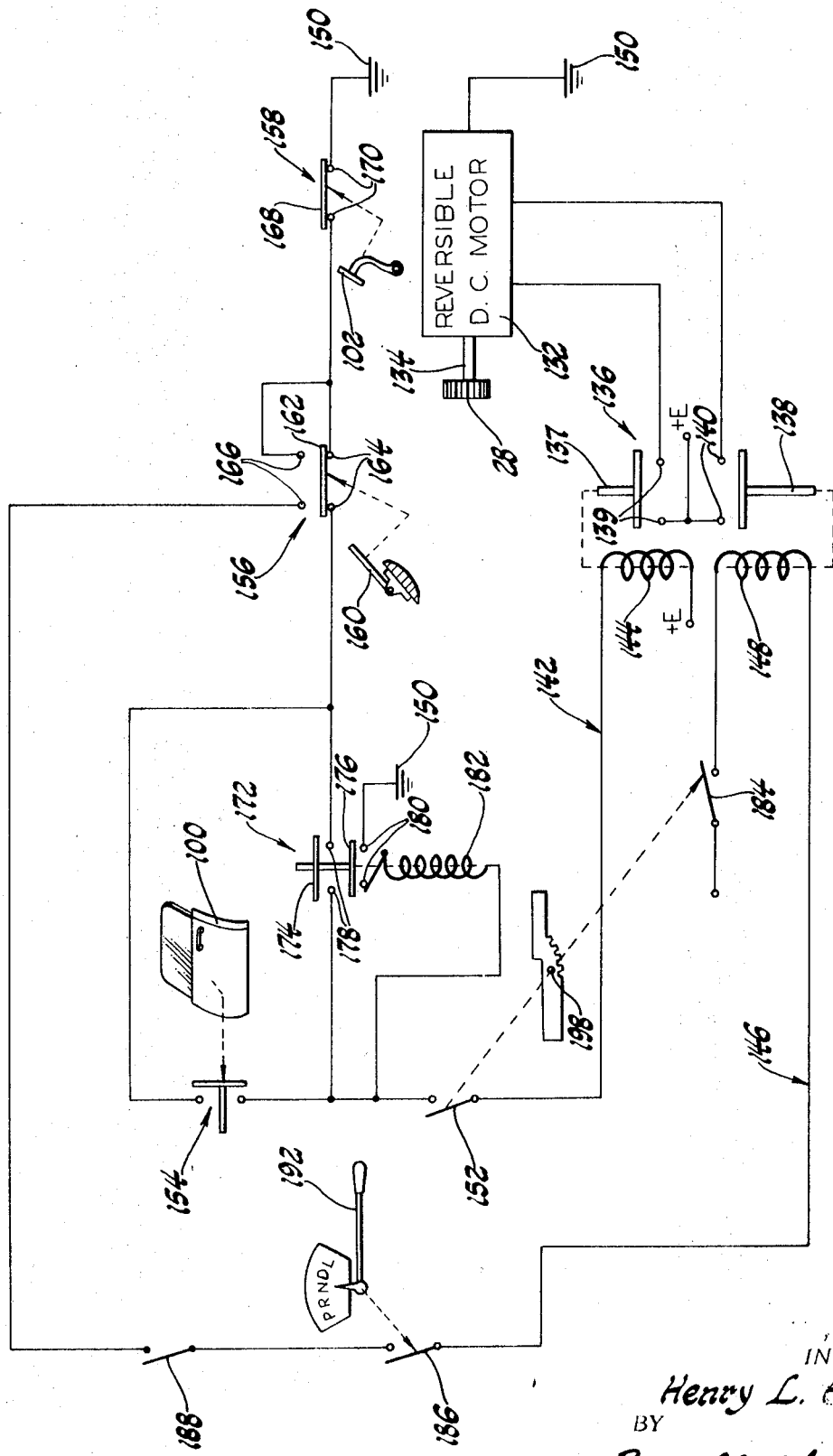

The various features and advantages of the subject invention will be best understood from a reading of the following specification which describes a specific embodiment in detail. This specification is to be taken with the accompanying drawings of which:

FIG. 1 is a cross-sectional view of the specific embodiment of the invention emphasizing the details of the mechanical actuator and output means; and, FIG. 2 is a schematic circuit diagram of an electrical conditioning circuit which may be employed with the apparatus of FIG. 1.

Referring now to FIG. 1, there is shown a mechanical actuator 10 comprising a housing 12 having cam member 14 disposed therein for linear and lateral displacement relative thereto. Both housing 12 and cam member 14 are preferably fabricated from steel, as are the majority of the parts in the assembly of FIG. 1. Cam member 14 is formed with an arcuate rack portion 16 and a straight or linear rack portion 18 longitudinally spaced along the right side thereof as viewed in FIG. 1. Longitudinally spaced along the opposite or left side is a projection 22 which along with inner wall 20 contains bearing balls 26, these balls riding along the inner surface of a flange bar 24 which forms part of the housing 12.

The linear displacement of the cam member 14 relative to the housing 12 is controlled by a drive pinion 28 which is rotatably mounted on a shaft 30 within the housing 12 and meshing with the straight rack portion 18 of the cam member 14. Pinion 28 is adapted to be reversibly driven by an electric motor in a fashion which will be described with reference to FIG. 2 thereby to displace the cam member 14 either up or down as shown in FIG. 1.

Also disposed within the housing 12 is a rack arm 32 which is pivotally mounted on a shaft 34 for angular or pivotal displacement within the housing 12. The rack arm 32 is provided with a straight, linearly distributed rack portion 36 which meshes with the teeth of a small, floating pinion 38. The pinion 38 is also in meshing engagement with the arcuate rack portion 16 of the cam member 14, thus, to form a mechanical connection between the cam member 14 and the pivotal rack arm 32. It can be seen, with reference to FIG. 1, that displacement of the cam member 14 downwardly from the position shown tends to rotate the floating pinion 38 in the counterclockwise direction, thus, causing it to ride along the rack portion 36 of the rack arm 32. This motion causes the rack arm 32 to pivot in a counterclockwise direction relative to housing 12.

Pivoting of the rack arm 32 in the counterclockwise direction as shown in FIG. 1 is resisted by the helical spring 40 which is mechanically disposed between the rack arm 32 and the housing 12. A suitable connection of the helical spring 40 may be made to the rack arm 32 on one end and a groove or notch 42 is made in housing 12 to receive the other end. Groove 42 is formed in a second raised flange bar 44 spaced from the first bar 24. Although not shown in FIG. 1, it is to be understood that the flange bars 24 and 44 are adapted to receive a cover plate which maintains the cam member 14, the floating pinion 38, and the rack arm 32 within the housing 12.

The pivotal motion of the rack arm 32 is transferred from the mechanical actuator 10 to the associated apparatus by output means of a mechanical type including a short axially displaceable plunger shaft 46. Shaft 46 is mounted for displacement in a slot 48 formed in the flange bar 44. The left end of plunger shaft 46 bears against the rack arm 32. The other end of the plunger shaft 46 extends outwardly from the housing 12 and is forked or otherwise formed so as to be disposed in mechanical engagement with a relieved area 50 on the lower end of a lever arm 52. Lever arm 52 is pivotally supported at the center on a fulcrum arm 54 by means of a short cross-shaft 56. The opposite end of the lever arm 52 is mechanically interconnected with an accumulator 58 which forms a mechanical interconnection between a brake pedal rod 60 and the piston of a master cylinder 62.

Referring again to FIG. 1, the mechanical accumulator 58 which forms part of the output connection between the mechanical actuator 10 and the master cylinder 62 includes a cylindrical housing 64 which is attached, such as by brazing or welding to an enlarged diameter flange 66 which is provided with circumferentially distributed axially extending holes for mounting on a vehicle firewall 67. Disposed in the center bore 68 of the flange 66 for axial displacement relative thereto is a cylindrical member 69 having an elongated shaft portion 70 integral therewith. The cylindrical member 69 is formed on one end with an axially extending opening 72 which receives the end of the brake actuator rod 60. The elongated shaft portion 70 extends into an unthreaded axially extending cavity in the piston 76 of the master cylinder 72 such that operation of the brake pedal actuator rod 60 produces a mechanical operation of the piston 76 of the master cylinder 62. This mechanical connection is easily accomplished by disconnecting the brake pedal actuator rod 60 from the piston 76 and disposing the mechanical accumulator 58 in between the two elements.

Loosely disposed about the elongated shaft portion 70 of the cylindrical member 68 is a flanged collar 78 which receives the outer end of the level arm 52. The unflanged end of the collar 78 bears against the shoulder 79 on the cylindrical member 68 to prevent axial relative displacement in the downward direction as shown in FIG. 1. The flanged end of the collar 78 receives one end of a helical spring 80 the other end of which bears against a washer 82. The washer 82 in turn bears against an assembly 84 including a right-hand portion which is threaded onto threaded shaft 70 to adjust tension in spring 80. The left-hand portion of assembly 84 is also threaded onto shaft 70 and bears against piston 76 to eliminate any play or axial lost motion between shaft 70 and piston 76. Accordingly, displacement of the lever arm 52 in a counterclockwise direction as shown in FIG. 1 compresses the spring 80 and tends to drive the piston 76 of the master cylinder 62 toward the brake-applied position. In the conventional fashion, this causes pressurization of the brake lines which, in FIG. 1, are represented by a single line 86. Pressurization of lines 86 in turn causes pressurization and actuation of the conventional wheel cylinders 88 which are operative to produce the conventional frictional braking action. The cylindrical housing 64 of mechanical accumulator 58 is provided with an upper flange plate 90 which is adapted to be bolted to a flange plate 92 which forms part of the master cylinder assembly 62. Flange plate 90 is mechanically interconnected with the mechanical actuator 10 such that the whole assembly may be handled and installed as a unit.

Referring now to FIG. 2, electrical circuitry is shown for suitably controlling the brake-applying apparatus of FIG. 1 in response to the opening of a vehicle door 100 while the vehicle is otherwise conditioned for ordinary traveling. Although the subject invention is being illustrated and explained with reference to a system for applying the brakes in response to the abnormal opening of the door 100, it is to be understood that the invention as disclosed herein may be so applied as to respond to any abnormal traveling condition in the state of a vehicle.

The circuit of FIG. 2 includes a reversible DC motor 132 having a rotatable output shaft 134 which is connected to the drive pinion 28 of FIG. 1. The direction of rotation of output shaft 134 is determined by a relay-controlled switch set 136 which includes armatures 137 and 138 carrying contact plates which are adapted to complete electrical current paths across terminal sets 139 and 140, respectively. Terminal set 139 and armature 137 form one relay control switch to control the application of current from a source +E to an armature of motor 132 to rotate the motor in one direction. Terminal set 140 and armature set 138 form another relay-control switch to control the application of current from source +E to an armature of motor 132 to rotate the motor in the reverse direction. Armatures 137 and 138 are normally disengaged from the terminal sets 139 and 140 such that both switches in set 136 are open and the motor 132 is at rest.

Contact between armature 137 and terminals 139 is produced by energization of a first circuit 142 which includes a coil 144. Current flow through coil 144 produces a magnetic force-driving armature 137 in the direction to engage terminals 139 causing motor 132 to rotate in a direction which rotates the drive pinion 28 in the counterclockwise direction of FIG. 1. Contact between armature 138 and terminals 140 is produced by energization of a second circuit 146 which includes a coil 148. Current flow in coil 148 engages armature 138 with terminals 140 to drive motor 132 in the opposite direction, thus, to rotate the pinion 28 in the clockwise direction, as shown in FIG. 1.

Circuit 142 includes in series with coil 144, a limit switch 152, a door-operated switch 154, and accelerator-operated switch 156, and a brake-pedal operated switch 158 all of which are connected in series between the source +E and ground 150. Limit switch 152 is arranged with respect to a pin 198 carried by the cam member 14 such that the switch 152 is closed to allow current flow therethrough when the cam member 14 is in the uppermost position of FIG. 1 and open when the cam member 14 reaches the lowermost position. Door-operated switch 154 is suitably arranged to be open when the door 100 is closed and vice versa. Switch 156 is suitably connected to an accelerator pedal 160 such that a movable contact 162 engages stationary contact terminals 164 whenever pedal 160 is in the undepressed condition. However, when pedal 160 is depressed, movable contact 162 is moved into engagement with a second set of contact terminals 166 in circuit 146 for purposes to be described. Switch 158 is suitably connected to the brake pedal 102 such that a movable contact 168 engages fixed contact terminals 170 when the brake pedal 102 is in the undepressed position. However, when brake pedal 102 is depressed, contact 168 is disengaged from contact terminals 170.

Circuit of FIG. 2 also includes a manually operable pushbutton switch 172 for energizing circuit 142 by operator control. Switch 172 includes two plates 174 and 176 on a single armature adapted to engage contact terminal pairs 178 and 180, respectively. Contact terminals 178 are connected electrically in parallel with switch 154 such that electrical contact between armature 174 and terminals 178 performs the same function as is performed by closing switch 154. Terminals 180 are connected in series between the source +E and a holding coil 182 which is connected to ground 150, as shown. Upon depression of pushbutton switch 172 to engage the armatures 174 and 176 with their associated contact terminals, a circuit is completed through coil 182 holding the armatures 174 and 176 in the depressed condition. When the rack cam 14 is full displaced to the left, as shown in FIG. 1, pin 198 opens limit switch 152 breaking the holding circuit through coil 182 and allowing the armatures 174 and 176 to disengage from terminals 178 and 180, respectively.

Circuit 146 includes a limit switch 184, the coil 148, a transmission selector switch 186, and ignition switch 188, accelerator control switch 156, and the brake control switch 158 all of which are connected in series between source +E and ground 150. Limit switch 184 is mechanically controlled by the pin 198 to assume an electrically closed condition whenever the cam member 14 is fully displaced to the top in the apparatus of FIG. 1. Accordingly, limit switch 184 operates in a complementary fashion with switch 152. Transmission selector switch 186 may be suitably interconnected with the transmission selector lever 192 such that switch 186 is closed whenever the selector lever is placed in the drive position; that is, any position other than park or neutral. As previously indicated, switch 156 is arranged such that the movable contact 162 is moved into engagement with terminals 166 when the accelerator pedal 160 is pressed. Brake control switch 158 is closed, as shown, when pedal 14 is undepressed. Accordingly, when the rack cam 98 is in the top position of the FIG. 1, apparatus such that switch 184 is closed, the transmission selector lever 192 is moved to a drive position to close switch 186, ignition switch 188 is closed and the accelerator pedal 160 is depressed to engage elements 162 and 166, circuit 146 is energized to direct current through coil 146 to engage control relay armature 138 with terminals 148. This energizes DC motor 132 to rotate the output shaft 134 and the drive pinion 28 in a direction to displace the cam member 14 to the right in the apparatus of FIG. 1. When the cam member 14 reaches the right-hand position, limit switch 184 is again opened the energizing coil 148 and opening terminals 140 to stop motor 132.

OPERATION

The specific operation of the electrical circuit diagram of FIG. 2 is believed to be obvious from the foregoing specification but is also described in detail in the specification but is also described in detail in the specification of the copending U.S. Ser. No. 801,618. That description is incorporated by reference herein and will not be given in detail.

The opening of the door 100 while the vehicle is in a condition for travel causes operation of the DC motor 132 to drive the pinion 28. As the pinion 28 rotates in the counterclockwise direction as shown in FIG. 1, the cam member 14 is moved from top to bottom, thus, rotating the floating pinion 38 in the counterclockwise direction and pivoting the rack arm 32 in the clockwise direction about the pivot 34. This counterclockwise rotation of rack arm 32 overcomes the resisting bias of spring 40 and displaces the short plunger shaft 46 outwardly, as shown in FIG. 1. This causes the lever arm 52 to be displaced in a counter clockwise direction about the pivot point 56, thus, compressing the coil spring 80 and urging the piston 76 of the master cylinder 62 to the brake-applied position. This pressurizes brake lines 86 and sets the brakes which are directly affected by the wheel cylinders 88.

When it is desired to release the brakes, the motor 132 is operated in the reverse direction, thus, to cause the drive pinion 28 to be rotated in the clockwise direction. This permits cam member 14 to be displaced from bottom to top as shown in FIG. 1, thus, causing the floating pinion 38 to rotate in a clockwise direction and permitting the rack arm 32 and the plunger shaft 46 to move inwardly. The coil spring 80 of the mechanical accumulator 58 drives the lever arm 52 in the clockwise direction about the pivot point 56 and the pressure in the brake lines 86, thus, pushes the master cylinder piston 76 back to the relaxed position. This relieves pressure in the brake lines 86 and relieves the brake force introduced on the vehicle by operation of the wheel cylinders 88.

As previously described, it is apparent that the vehicle brakes may be operated in the normal fashion at any time by the normal depression of the brake pedal which in turn causes axial movement of the brake actuator rod 60. Since the brake actuator rod 60 is directly connected to the piston 76 of the master cylinder 62 through the cylindrical member 68, normal vehicle brake operation is permitted even though the automatic brake-applying device of the present invention has been installed.

Referring again to FIG. 1, it has been found desireable to install longitudinally spaced flexible teeth 200 and 202 at the opposite longitudinal ends of the straight rack portion 18 of the cam member 14. These flexible teeth 200 and 202 permit the electric motor 132 to coast to a stop after achieving full travel of the cam member 14 in both directions without doing any damage to the teeth of the drive pinion 28 or to any other associated mechanical components of the system. When the limit of travel is reached in one direction, the flexible teeth 200 and 202 simply ratchet over the teeth of the drive pinion 28. However, when the reverse travel is to be accomplished, the teeth 200 and 202 have enough stiffness to cause the cam member 14 to be moved until a good, solid engagement between the teeth of pinion 28 and the rack portion 18 of cam member 14 is accomplished.

It is to be understood that the embodiment of the invention described herein is illustrative in nature and is not to be construed in a limiting sense.

The embodiments of the invention in which an exclusive property or privilege is claimed are defined as follows:

1. In an auxiliary brake system for applying the brakes of a vehicle in response to the opening of a door; an actuator having a housing, a cam member displaceably mounted in the housing and having a rack portion, a rack arm pivotally mounted in the housing and having a rack portion, a gear disposed between and in meshing relationship with the rack portions of the cam member and rack arm, means responsive to the opening of a vehicle door for reversibly displacing the cam member between first and second positions to pivot the rack arm, and piston means displaceably associated with the rack arm for applying a brake when the cam member is in the first position and releasing the brake when the cam member is in the second position.

2. Apparatus as defined in claim 1 wherein the piston means includes an hydraulic cylinder, at least one brake line pressurized by the cylinder and a wheel brake unit operated by the pressurization of the brake line.

3. Apparatus as defined in claim 1 including output means operatively connected between the rack arm and the piston means and displaceable between brake applied and brake released positions by the rack arm, and means biasing the output means to the brake released positions.

4. Apparatus as defined in claim 3 wherein the output means includes a shaft, one end of the shaft being in operative engagement with the piston means and the other end of the shaft being adapted to receive a brake actuator rod such that a vehicle brake may be applied by an external means through the output member.

5. Apparatus as defined in claim 4 wherein the bias means is a coil spring urging the shaft toward the brake actuator rod.

6. Apparatus as defined in claim wherein the means responsive to the opening of a vehicle door includes a reversible electric motor operatively connected to displace the cam member.

7. Apparatus as defined in claim 6 wherein the cam member has a second rack portion thereon, and a drive pinion meshing with the second rack portion and rotatable by said electric motor.

8. Apparatus as defined in claim 7 wherein the second rack portion has means at each end thereof for permitting unidirectional slippage between the pinion and the rack portion.

9. Apparatus as defined in claim 1 including a plunger bearing against the rack arm to be displaced thereby, a lever having one end connected to the plunger, the other end connected to the piston means and an intermediate pivot point connected to the housing.

10. Apparatus as defined in claim 9 including bias means to urge the lever in a direction tending to release the brake.

11. In a system for applying the brakes of a vehicle in response to an abnormal travelling condition in the state of the vehicle: a reversible electric motor, means for energizing the motor in response to the existence of said condition, a housing, a linearly displaceable arm having a rack portion disposed within the housing and operatively connected for reversible displacement relative to the housing by the motor, a rack arm pivotally mounted in the housing, a gear meshing between the rack portion of the displaceable arm and the rack arm, and output means displaceable by the rack arm between brake released and brake applied positions, said output means including at least one member adapted for direct mechanical connection to a master cylinder to actuate the same when the output means is in the brake applied position.

12. Apparatus as defined in claim 11 wherein the said one member is also adapted for direct mechanical connection to a brake actuator rod for external operation thereby.